Patented Sept. 18, 1928.

1,684,671

UNITED STATES PATENT OFFICE.

HAROLD P. HAYDEN, OF WOODBRIDGE, NEW JERSEY, ASSIGNOR TO THE BARBER ASPHALT COMPANY, OF PHILADELPHIA, PENNSYLVANIA, A CORPORATION OF WEST VIRGINIA.

METHOD OF PREVENTING EVAPORATION FROM CONCRETE DURING CURING.

No Drawing. Application filed October 12, 1925. Serial No. 62,194.

In modern cement concrete construction it is desirable to retard the evaporation of water from the concrete after it is placed and during the curing period in order to insure thorough hydration of the cement and thus produce a concrete of maximum strength.

Heretofore various methods of protecting concrete during the curing period, especially in roadway and the like construction where the concrete has a large exposed surface, have been used, for example, one well known method used in roadway and the like construction involves the application of wet burlap to the exposed surface of the concrete immediately after finishing, the burlap being kept wet, as by sprinkling, until the concrete has set, or attained a rigidity such as to withstand a substantial weight without marring, after which the burlap is removed and the surface covered with earth, or straw, which is maintained wet until the expiration of the stipulated curing period, when the earth, or straw, is removed. Another method, which has been attempted, involves the spreading of tar on the surface of concrete after the concrete has set, or attained a rigidity such as to enable workmen to walk on it without marring the surface. Still another method involves the provision of dikes about the concrete for maintaining a pond of water on its surface until it is ready for use.

The methods heretofore used for protecting concrete during the curing period are open to numerous objections, more especially in that they involve substantial expense and are ineffective in preventing the evaporation of water from the concrete during the critical period before the concrete has set, or the protection of the concrete is not attempted until substantially after the critical period has passed, as is evidenced, for example, by the occurrence of hair cracking, which is avoided by the practice of the method according to my invention.

I have discovered that if cement or cement concrete be treated, after it is finished, i. e., smoothed off, or broomed if so finished, and before it has set, i. e., before it will support a substantial weight, such as that of a man walking on it, without marring, by the formation on the exposed surface thereof a water impervious film, which preferably will adhere to the concrete, and the concrete be then permitted to set and cure without disturbance, the concrete will cure without hair cracking and when cured will be found to have greatly increased strength, durability and resistance to weathering as compared to concrete treated by the methods heretofore known.

In accordance with my invention, I apply the water impervious film to the exposed surface of cement or concrete to be cured before it has set, by which, as has been indicated, I mean before the concrete has attained a condition of firmness or rigidity such that it will support a substantial weight without marring of the surface, as for example, the weight of a man walking on it. Preferably, the film is applied as soon as practical after the cement or concrete is laid and finished; however, it must be applied before the concrete has set, as indicated above, if the benefits of my invention are to be obtained.

In accordance with my invention, the water impervious film, when applied before the cement or concrete has set, as indicated, acts to prevent evaporation of water from the cement or concrete, and especially from exposed surface thereof, or to retain sufficient original water in the cement or concrete, during that period in which the continuous presence of requisite water is essential for the hydration of the cement and the avoidance of hair cracking of the surface.

As illustrating different applications of the principle of my invention I will give the following examples:—

A bituminous paint such as ordinary liquid asphalt paint, consisting of a residual asphalt base of twenty to thirty penetration at 77° F., or native asphalt, dissolved in a volatile petroleum solvent may be used as the coating for this purpose. Such a paint when applied, for example at the rate of one gallon per 100 sq. ft. as soon as practical after pouring and finishing of the concrete, but in any event before the concrete has set, will form a satisfactory protective impervious film, and prevent evaporation of water from the concrete during curing.

Ordinary linseed oil paint will also form a satisfactory impervious film if applied in sufficient quantity after the superficial water has subsided after pouring and finishing of the concrete.

Still another method of practicing my invention, and one that is distinctly preferred possesses further advantages. To the surface of wet unset concrete and preferably as soon as practical after laying and finishing I apply, as by means of a spray, a water-external-phase bituminous emulsion such as is often called in paving practice "cold repair cement." Such emulsion possesses the property of breaking after a short exposure to the air in consequence of the evaporation of the water, with the formation of a water impervious adherent film of bitumen on the surface of the concrete.

I have found that cement concrete which has thus been protected by the application thereto, when freshly placed, or before it has set, of a water impervious and preferably adherent film possesses a remarkably higher tensile strength after curing or aging than is possessed by the same concrete not so treated, and the occurrence of hair cracks is avoided.

Films of this character may be formed with great ease by applying the coating medium by means of a paint spray. In roadway construction a bituminous emulsion may be applied as soon as the surface is finished.

The cost of material and labor involved in this method of treating concrete is relatively low, in comparison with the cost of materials and maintenance in a moist condition by any other method of treatment, and the results are not dependent upon the subsequent care of the work after the film is once in place it being only necessary after the application of the film to permit the concrete to set and become sufficiently cured without disturbance of the body thereof.

When using the old methods, it is frequently impossible to keep concrete properly wetted for the requisite curing period, but with my new method the curing proceeds without interruption to completion. This is of particular advantage in road construction as construction traffic may be directed over the new concrete after say one week without interrupting the curing of same.

It is not necessary to cover the coated surface of a concrete roadway with sand or other surfacing material when the protective coating is applied at the rate of 1 gal. per 100 sq. ft. or in less quantity. It is however possible to apply a sufficient amount of bituminous protective coating followed at the completion of the curing period by the application of sand or stone chips to form a temporary protective wearing surface for the concrete during its early life or after the concrete has cured any desired form of wear surface may be applied.

In cases where this method is used in connection with concrete construction which is afterward to be protected by membrane waterproofing or a wear surface the protective bituminous coating applied in carrying out the method embodying my invention may serve as a primer coat and will facilitate the application of the waterproofing or wear coat system.

Having thus described my invention, I claim:—

1. The method of preventing evaporation of water from cement concrete during the curing period which consists in applying to the surface of the concrete before curing an adherent film impervious to water.

2. In the practice of the method described in claim 1 the use as the adherent film of a water-external-phase bituminous emulsion.

3. The method of preventing evaporation of water from the surface of a freshly laid cement concrete roadway which consists in spraying upon such surface, as soon as feasible after it is laid and before it has cured, a continuous bituminous film.

4. The method of preventing evaporation of water from the surface of a freshly laid concrete roadway which includes spraying upon such surface, before the concrete has set, a bituminous emulsion for the formation of an adherent water impervious bituminous film thereon.

5. The method of curing a concrete roadway which includes applying to the upper surface of a roadway, before the concrete has set, a coating of unheated bituminous paint-like material for the formation of a water impervious film thereon and permitting the concrete to cure.

6. The method of curing a concrete roadway which includes applying to the upper surface of the roadway, before the concrete has set, a coating of unheated bituminous material for the formation of a water impervious film thereon and permitting the concrete to cure.

7. The method of curing cement which includes applying to an exposed surface of a moist, unset body of cement a coating of unheated paint-like material to form a water impervious film thereon adapted to prevent evaporation of water from the body and leaving the body to cure.

8. The method of curing a body of cement concrete having an exposed surface, which includes applying to the exposed surface of the concrete, before the concrete has set, an adherent film impervious to water and adapted to prevent substantial evaporation of water from the concrete during the curing period.

9. The method of curing a body of cement concrete having an exposed surface, which includes applying to the exposed surface of the concrete, before the concrete has set, a water-external-phase bituminous emulsion for the formation of an adherent water-impervious film on such surface and thereafter permitting the concrete to cure without substantial disturbance of the body thereof.

10. The method of curing a body of cement concrete having an exposed surface, which consists in the application of a water-impervious, adherent film, to the exposed surface thereof substantially immediately after the subsidence of superficial water and thereafter permitting the concrete to cure without substantial disturbance of the body of the concrete.

11. The method of curing a body of cement concrete having an exposed surface, which consists in the application to the exposed surface substantially immediately after the subsidence of superficial water of a water-external-phase bituminous emulsion for the formation of an adherent, water-impervious film thereon and thereafter permitting the concrete to cure without substantial disturbance of the body of the concrete.

In testimony whereof I have hereunto signed my name at Philadelphia, Pennsylvania, this 8th day of October, 1925.

HAROLD P. HAYDEN.